(12) United States Patent
Korotky et al.

(10) Patent No.: US 7,171,116 B2
(45) Date of Patent: Jan. 30, 2007

(54) PROVISIONABLE KEEP-ALIVE SIGNAL FOR PHYSICAL-LAYER PROTECTION OF AN OPTICAL NETWORK

(75) Inventors: Steven K. Korotky, Toms River, NJ (US); David S. Levy, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 509 days.

(21) Appl. No.: 10/245,029

(22) Filed: Sep. 17, 2002

(65) Prior Publication Data

US 2004/0052518 A1    Mar. 18, 2004

(51) Int. Cl.
*H04B 10/00* (2006.01)

(52) U.S. Cl. ............................................. 398/5; 398/16

(58) Field of Classification Search .................... 398/4, 398/5, 16, 175, 176
See application file for complete search history.

(56) References Cited

U.S. PATENT DOCUMENTS

| | | | | | |
|---|---|---|---|---|---|
| 4,543,665 | A | * | 9/1985 | Sotelo et al. ............... | 379/56.3 |
| 4,608,714 | A | * | 8/1986 | Juengel ........................ | 398/109 |
| 4,833,668 | A | * | 5/1989 | Rowley et al. ............... | 398/21 |
| 4,878,726 | A | * | 11/1989 | Fatehi .......................... | 385/16 |
| 5,838,475 | A | * | 11/1998 | Takeyari et al. ............. | 398/175 |
| 5,889,604 | A | * | 3/1999 | Hayashi ....................... | 398/192 |
| 5,986,783 | A | * | 11/1999 | Sharma et al. ............... | 398/59 |
| 6,016,371 | A | * | 1/2000 | Wickham et al. ............. | 385/10 |

OTHER PUBLICATIONS

"Distortion Characteristics Of Optical Directional Coupler Modulators" by T. R. Halemane and S. K. Korotky, IEEE Transactions On Microwave Theory and Techniques, vol. 38, No. 5, May 1990, pp. 669-673.

"Optical Switching In Transport Networks: Applications, Requirements, Architectures, Technologies, and Solutions" by Daniel Y. Al-Salameh, et al.; Optical Fiber Telecommunications, vol. IVA, pp. 295-373.

\* cited by examiner

*Primary Examiner*—Christina Y. Leung

(57) ABSTRACT

A dual-output Mach-Zehnder modulator (MZM2) and configurations of optical transmitters based on the MZM2 which obviate the optical splitter that is typically used to provide keep-alive functionality in redundantly-connected, protected optical networks, SONET add-drop multiplexers, and optical IP routers. The configurations provide equivalent keep-alive utility at a reduced system cost relative to the prior art. The configurations also support enhanced Operations, Administration, Maintenance, and Provisioning (OAM&P) functionality at little to no additional cost relative to the prior art. Instead of being a direct copy of the service signal, the keep-alive of this configuration is an inverted version of the service signal. This inverted version of the service signal is supported at a client by utilization of means for detecting and righting the inverted signal. The inverted state of the signal on the protection path can be used as an inband indicator to notify the client in the event of a failure on the service path. This inband indicator requires little or no additional circuitry to accommodate. Another aspect of this invention allows the provisionable substitution of the inverted signal with a preemptive signal to support low-priority traffic when there is no fault on the service path S.

39 Claims, 9 Drawing Sheets

PROVISIONABLE KEEP-ALIVE SIGNAL FOR PHYSICAL-LAYER PROTECTION OF AN OPTICAL NETWORK

BACKGROUND OF THE INVENTION

1. Field of the Invention

The present invention relates to optical networks and more specifically to techniques for protecting optical physical links using redundant protection channels.

2. Description of the Related Art

Optical transmission systems, such as those using Dense Wavelength Division Multiplexing (DWDM), provide extremely wide bandwidth for communications. Each DWDM transmission system carries a plurality of optical channels (wavelengths) on each optical fiber and through each optical repeater. However, there is a trade off between the lower cost of transport provided by wider bandwidth communications channels and their vulnerability to a large-scale disruption of communications services because of a transmission equipment and/or medium failure. It is, therefore, important that DWDM optical transmission systems have the capability to quickly recover from such transmission failures.

Protection of optical networks in the event of failures (e.g., fiber cuts, transmitter failure, and amplifier instabilities) typically involves redirecting the service traffic from a channel on the optical fiber within which it was originally carried (i.e., the service channel, denoted by S) that has been affected by the failure to another unaffected source of bandwidth (i.e., the protection channel, denoted by P) whereby the service traffic may ultimately reach its intended destination.

Typically, optical switches located within a node are used to accomplish this redirection. For example, it is typical to direct optical signals transmitted from edge equipment along one direction on the network (e.g., East) to another (e.g., West). In a ring, mesh, hypercube, or other redundantly connected optical network topology, performance monitoring that analyzes and monitors the traffic on S and P at the various destination and intermediate nodes can be used by a microcontroller to autonomously switch over to a protection channel or path P by sensing a failure on the primary service path S. Note that the protection channel P can be the same or different optical wavelength (i.e., wavelength diversity), but it is typically on a different fiber, and that fiber is typically carried in a different bundle along a unique path from the first (i.e., path diversity).

There are a number of different optical protection schemes in use today that build upon this basic principle. These include 1+1 protection, span protection, 1:1 protection, and shared protection. These schemes are described in detail in Al-Salameh, D. Y., Korotky, S. K., Levy, D. S., et al., *Optical Fiber Telecommunication—Volume IVA*, Elsevier Science, USA, Ch. 7, pp. 318–327, incorporated herein by reference. Additional shared optical protection schemes denoted 1:N are discussed in detail in U.S. patent application Ser. No. 09/675,733 filed on Sep. 30, 2000 as attorney docket no. Al-Salameh, D. Y., 10-1-2-5-35, also incorporated herein by reference.

It is a generally accepted practice to provide a continuous or "keep-alive" signal to the protection channel P to allow the system to determine that P is alive and alarm free (i.e., kept alive) prior to a given failure event. Keep-alive signals can be provided in numerous ways; however, it is typical to use a fairly accurate copy of the service signal as the keep-alive source, and it is typical of all of the schemes referenced above to derive this copy via an optical splitting function of some nature.

There are two basic schemes in use today for modulating a light signal with data. The first scheme, termed "direct modulation" involves the application of the data or modulation signal directly to the laser source, essentially switching the laser on and off corresponding to a modulating data stream of logical "1"s and "0"s. This scheme suffers from instability in the transmission wavelength of the laser referred to as "chirp" and related transient effects that result from the direct amplitude modulation of the laser. The second and generally preferred scheme for optical modulation is termed "external modulation." In this preferred scheme, the laser is driven at a constant power level and the resulting continuous wave (CW) output of the laser is fed to an "external modulator" such as a Mach-Zehnder (MZ) device.

Thus a typical optical transmitter configuration is a CW laser followed by an MZ external modulator and, in protected optical networks, it is typical to follow this configuration with an optical splitter to generate the signals that will supply light to the service S and protection P channels.

Use of an optical splitter to generate the keep-alive signal has the inherent disadvantage of introducing a splitter loss (e.g., ~3.5 dB) into the signal path that may result in higher system costs to overcome (e.g., additional optical amplifiers in the path, higher-cost transmitter lasers, or more-expensive low-loss components in the transmitter or optical pathways to save power budget). As an alternative to an optical splitter, a network's transmission equipment (e.g., an optical translation unit (OTU)) can be designed to have an extra transmitter that serves the keep-alive function. However, such a device is expensive due to the cost of the high-speed optoelectronics needed in the extra transmitter. Optionally, a single-channel OTU in the line system can be designed (i.e., programmed) to transmit a keep-alive signal when it is not being fed by an input signal. This approach is still burdened with the cost of the additional OTU hardware and requires intelligence in the OTU and complex control algorithms to distinguish between transients on the line system and actual failures.

SUMMARY OF THE INVENTION

The present invention involves a new use of a dual-output Mach-Zehnder modulator (MZM2) and new configurations of optical transmitters based on the MZM2 that obviate the optical splitter typically used to provide keep-alive functionality in redundantly connected, protected optical networks, synchronous optical network (SONET) add-drop multiplexers, and optical internet-protocol (IP) routers. The new configurations provide equivalent keep-alive utility at a reduced system cost relative to the prior art. The new configurations also support enhanced Operations, Administration, Maintenance, and Provisioning (OAM&P) functionality at little to no additional cost relative to the prior art. Instead of being a direct copy of the service signal, the keep-alive of this new configuration is an inverted version of the service signal. This inverted version of the service signal is supported at a client by utilization of means for detecting and righting the inverted signal. The inversion of the signal on the protection path relative to the service path may be used as an inband indicator to notify the client in the event of a failure on the service path. This inband indicator requires little or no additional circuitry to accommodate. Another aspect of this invention allows the provisionable substitution of the inverted signal, or more generally, the keep-alive signal, with a preemptive signal to support low-priority traffic when there is acceptable signal quality on the service path S. This involves minor modifications to the client to realize simplified support for preemptive traffic.

In one embodiment, the present invention is an apparatus for transmitting optical signals over an optical communications network. An input port is configured to receive an input signal, and a modulator is configured to generate first and second modulated optical signals based on the input signal, wherein the first and second modulated optical signals are substantially inverted versions of each other. First and second output ports are configured to provide the first and second modulated optical signals.

In another embodiment, the present invention is a method for transmitting optical signals over an optical communications network. The method includes the steps of receiving an input signal, generating first and second modulated optical signals based on the input signal (where the first and second modulated optical signals are substantially inverted versions of each other), and then outputting the first and second modulated optical signals.

In another embodiment, the present invention is a method for receiving optical signals over an optical communications network, which includes the steps of receiving a first optical signal (e.g., S) associated with a service channel in the network, receiving a second optical signal (e.g., P) associated with a protection channel in the network, detecting whether the service channel is acceptable, and selecting the second optical signal if the service channel is not acceptable, where the second optical signal is a substantially inverted version of the first optical signal.

In another embodiment, the present invention is a method for receiving an optical signal over an optical communications network, which includes the steps of receiving the optical signal, determining whether the optical signal is a protection channel signal by detecting that the optical signal is a substantially inverted version of a corresponding service channel signal; and inverting the optical signal upon determining that the optical signal is the protection channel signal.

In another embodiment, the present invention is an optical communications network including a first transceiver redundantly connected to a second transceiver via first and second optical paths. The first transceiver is configured to convert an input signal from a first client in the network into first and second modulated optical signals that are substantially inverted versions of each other. The first optical path is configured to convey the first modulated optical signal from the first transceiver to the second transceiver. The second optical path is configured to convey the second modulated optical signal from the first transceiver to the second transceiver. Finally, the second transceiver is configured to receive the first and second modulated optical signals and select one of them for transmission as an output signal to a second client in the network.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Prior Art Optical Protected Network

Figure 1:
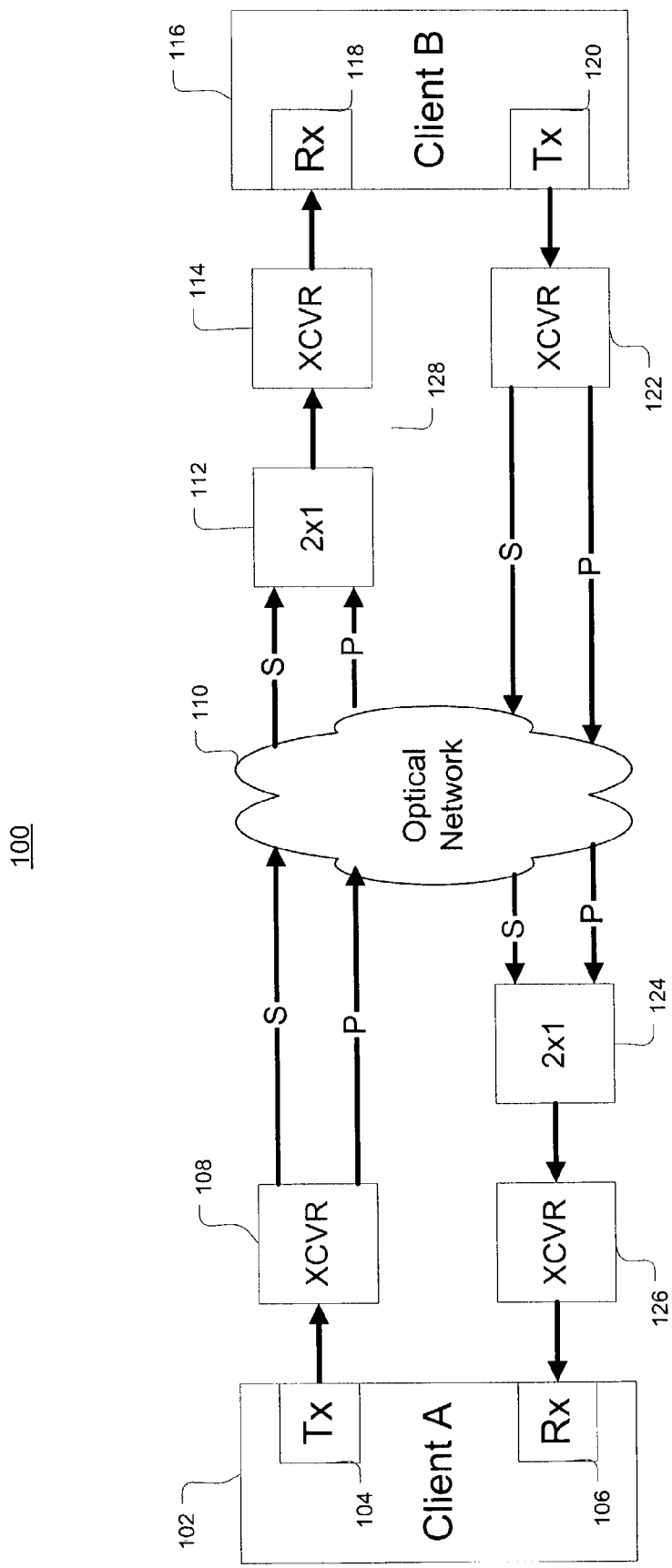
FIG. 1 is a block diagram of an optical network of the prior art.

FIG. 1 is a top-level view 100 of a typical redundantly connected, protected optical network of the prior art showing detail for two clients (Client A and Client B) that are participating in a two-way communication. Transmitter 104 of Client A 102 sends data to receiver 118 of Client B 116 through transceiver (XCVR) 108, optical network 110, 2×1 optical switch 112, and XCVR 114. Transmitter 120 of Client B 116 sends data to receiver 106 of Client A 102 through XCVR 122, optical network 110, 2×1 optical switch 124, and XCVR 126.

Prior Art Transceiver

Figure 2:
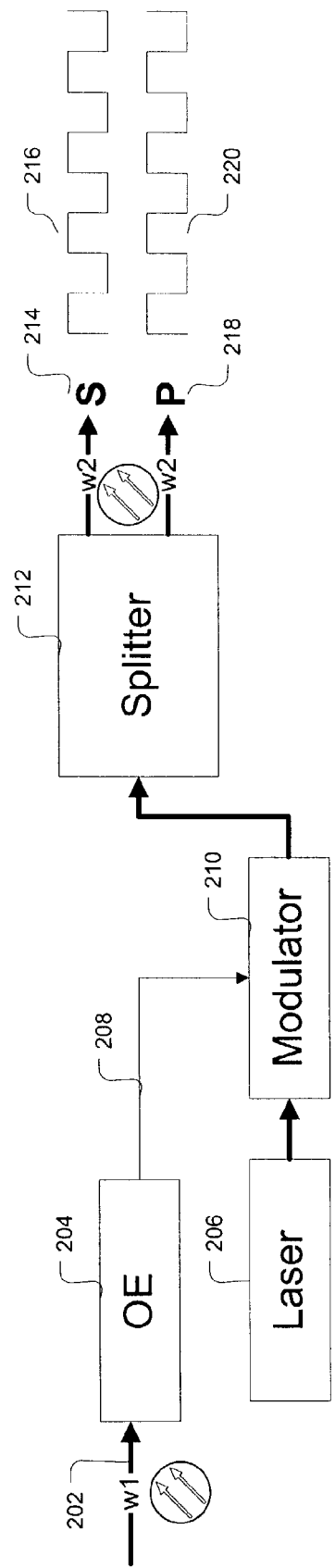
FIG. 2 illustrates the internal architecture of transceiver (XCVR) 108 of FIG. 1.

A simplified block diagram of XCVR 108 of FIG. 1, including the components of a conventional Optical Translation Unit (OTU), is illustrated by FIG. 2. FIG. 2 shows XCVR 108 receiving optical input signal 202 on a given wavelength w1. Optical-to-electrical (OE) unit 204 converts optical input signal 202 to the electrical domain for further processing. The resulting electrical signal 208 feeds external modulator 210 (typically implemented using a single- or dual-output Mach-Zehnder modulator) which then modulates the output of local CW laser source 206 of wavelength w2, where w2 is typically but not necessarily a different wavelength from the input wavelength w1. The output of modulator 210 then feeds optical splitter 212 which optically splits its input signal into two roughly identical output signals. These output signals then drive two separate fibers representing the service channel S 214 and the protection channel P 218, respectively. As illustrated by the representative waveform 216 for the service channel S and the representative waveform 220 for the protection channel P, the two outputs of splitter 212 are in phase (i.e., of the same polarity).

Suitable alternative devices may be substituted for external modulator 210 of this illustration including any devices from the classes known as electro-absorption and electro-optic modulators, the former class including devices composed of materials used in semiconductor lasers, and the latter class composed of materials whose refractive index can be altered by an applied electric field. The waveforms are provided for the purpose of illustration of polarity and represent only approximately the amplitude vs. time plot for an optical signal driven by a bit pattern of "1, 0, 1, 0, 1, 0, 1". Details of framing and protocol encapsulation are not illustrated. Additionally, in this simplified illustration, for clarity, details of optical amplification, wavelength selection, demodulation, error detection/correction, and other standard processes that typically occur within a transceiver are not explicitly shown in FIG. 2.

Failure Protection in the Prior Art

Figure 3:
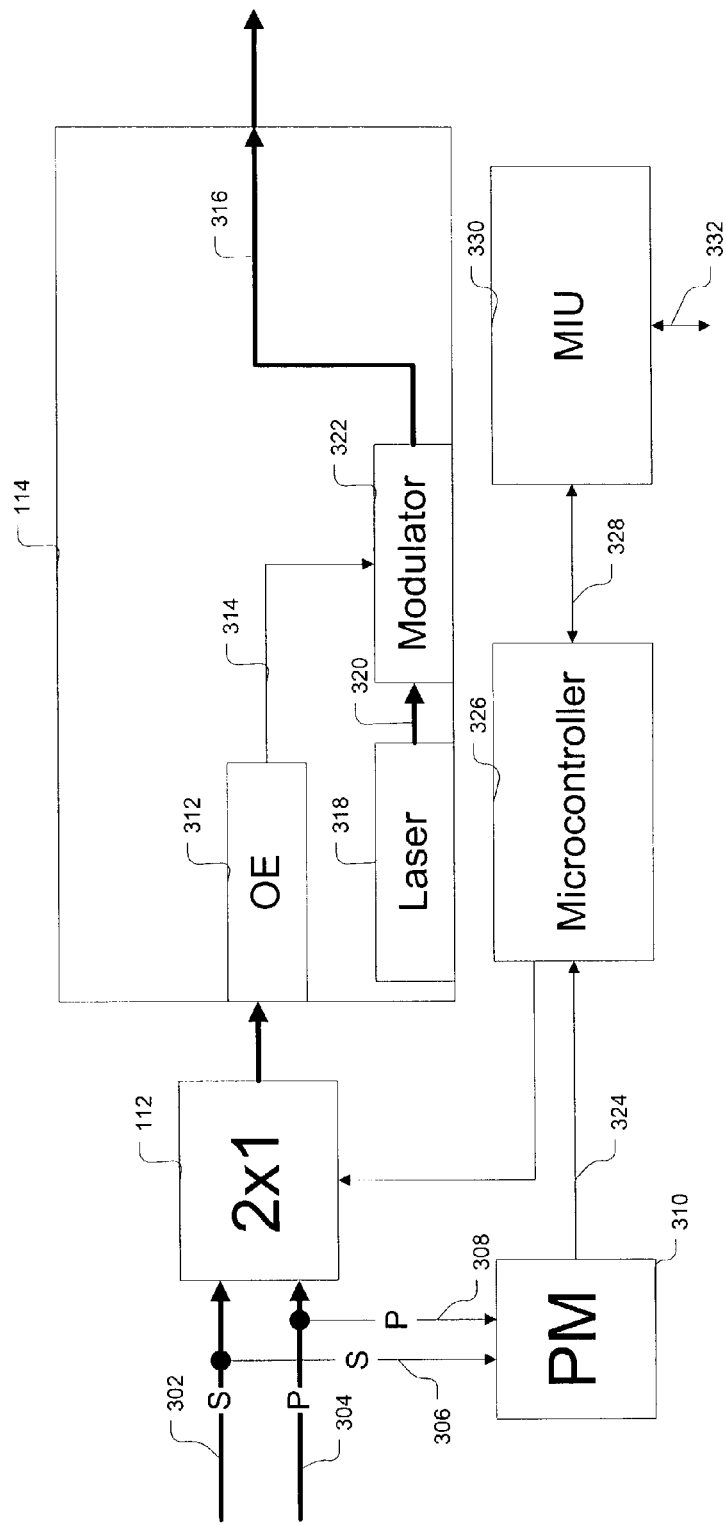
FIG. 3 illustrates the internal architecture of XCVR block 128 of FIG. 1.

Referring back to FIG. 1, it should be understood that the signal carried on the protection channel P is typically an in-phase (i.e., same polarity) approximate copy of the signal that is driving the service channel S. The protection channel is typically on a different fiber, and that fiber is typically carried in a different bundle along a unique path from the service channel (i.e., path diversity). In the event of a failure on the service channel S, for example, in a transmission from Client A 102 to Client B 116, the redundant copy of the service signal carried on the protection channel P can optionally be selected (via appropriate control of 2×1 switch 112) until such time as the service channel is recovered. Typically a microcontroller or microcomputer will be used in combination with a Performance Monitor (PM) to assess the relative signal quality of S and P. This arrangement is illustrated by the FIG. 3, which represents a simplified view of XCVR block 128 of FIG. 1. As shown in FIG. 3, PM 310 will typically sample both service channel S 302 and protection channel P 304 at a receiving node prior to, or in common with input to 2×1 switch 112. Samples 306 of S and samples 308 of P will feed PM 310, which will report the relative signal quality of S and P to microcontroller 326 via reporting interface 324. Microcontroller 326 will respond to the information received from PM 310 and in accordance with its software programming and in consideration of other information available to it (for example, via interface 328 with Management Interface Unit (MIU) 330), control 2×1 switch 112 to select the signal carried on either S 302 or P 304 to drive GE unit 312. Output 314 of GE unit 312 will control the modulation by modulator 322 of output 320 of local CW laser 318. This selection ultimately determines signal 316, which exits XCVR 114. Similarly, referring back to FIG. 1, for transmission from Client B 116 to Client A 102, S and P are sampled just prior to input to 2×1 switch 124 by a performance monitor (detail not shown) associated with XCVR 126 and an appropriate selection made by a microcontroller (detail not shown) via control of 2×1 switch 124.

Optical network cloud 110 of FIG. 1 redundantly connects the nodes in the network via wavelength or physically distinct paths, either in a ring, mesh, or other optical network topology, whereby the protection channel, which provides protective coverage for one or more service signals, and the service channel itself, may reach a destination node directly or via multiple hops through intermediate nodes.

Transmitter Utilizing Dual-Output Mach-Zehnder (MZM2)

Figure 4:
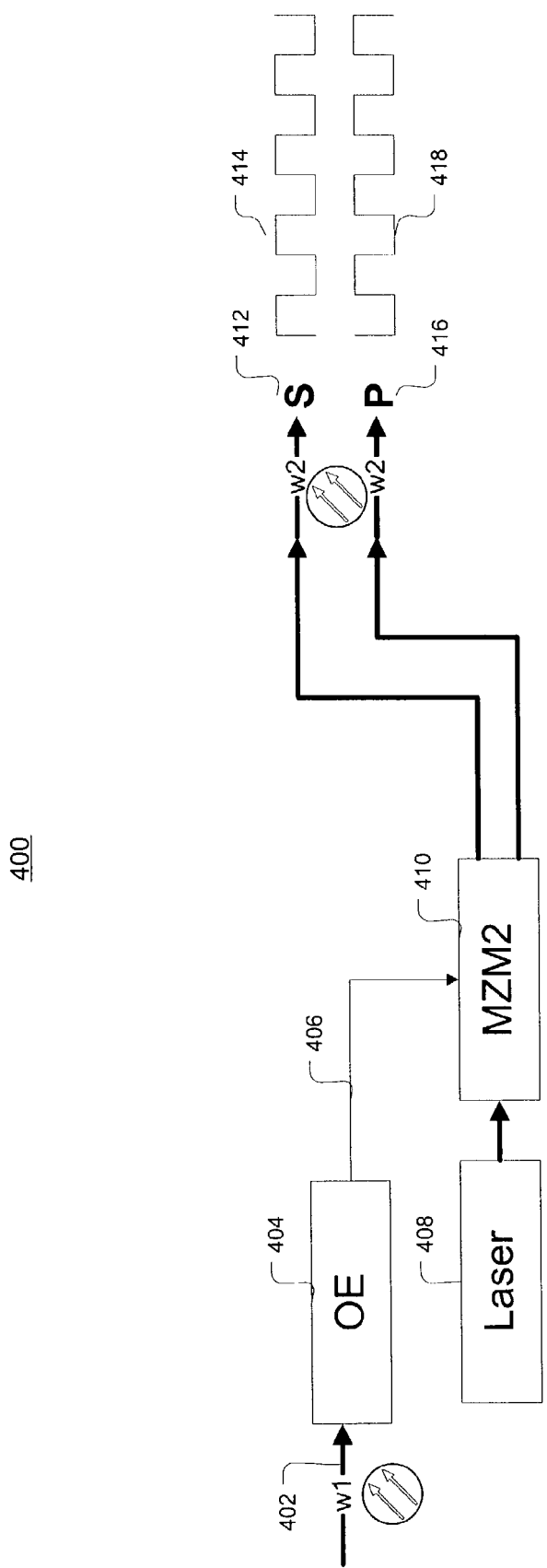
FIG. 4 illustrates a transceiver according to one embodiment of the current invention.

In one embodiment of this invention, the combination of external modulator 210 and optical splitter 212 of FIG. 2 is replaced with a dual-output Mach-Zehnder modulator (MZM2). This is illustrated by FIG. 4 where MZM2 410 is shown driving both service channel S 412 and protection channel P 416 fibers directly, without the need for an intervening splitter in the path. MZM2 410 serves as both modulator and splitter with the exception that the two signals generated by MZM2 410 are inverted versions of each other as illustrated by waveform 414 representing the polarity of the service signal that is carried on the service channel S and waveform 418 which represents the opposite polarity that is carried on the protection channel P. Depending on the implementation, the amplitudes of the service signal, and its substantially inverted representation that is carried on the protection channel, may be the same or different. Analogous to XCVR 108 of FIG. 2, in FIG. 4, optical input 402 to XCVR 400 feeds OE 404, which then outputs modulator control 406. Also analogous to XCVR 108 of FIG. 2, in FIG. 4, CW laser 408 provides an output for modulation. However, in XCVR 400, the output of laser 408 is modulated by MZM2 device 410 under the control of OE output 406. Accommodation of the protection signal as a substantially inverted copy of the service signal can be made with minor additional system cost. The result of the invention is thus the replacement of two components, i.e., a modulator and a splitter with one MZM2, yielding a reduced component cost in a typical transceiver. Additionally, because the power loss of a single MZM2 can be much less than that of the modulator-splitter solution of the prior art, the overall system cost of the invention might also be reduced relative to the prior art since less amplification may be required in the end-to-end optical pathways.

Accommodating the Inverted Protection Channel

To accommodate the signal on the protection channel P of a network incorporating the XCVR configuration of this invention as illustrated by FIG. 4, an inversion or "righting" of the signal carried on P might need to be done prior to delivery to a final destination at a client. Note that, in the hybrid electro-optical networks of today, optical-to-electrical and electrical-to-optical conversion of a signal is done repeatedly in client-to-client communications. Thus, the signal on P will find itself represented electrically at many points in the network. Inversion in the electrical domain is a low-cost operation. Additionally, because differential transport is commonly encountered at various points along a hybrid electro-optical network for purposes of noise immunity and signal recovery, it is typical for both physical-layer protocols and the devices that interface to these protocols to include inversion detection and correction mechanisms. Thus, to a certain extent, the circuitry and protocols defined for these communications systems intrinsically tolerate or correct inversion, and for those cases where they do not, a means to detect and correct the inversion is inexpensive to implement.

As an example, in SONET networks, a basic STS-1 frame repeats every 810 bytes and begins with the start-of-frame delimiter 0xF628 or 1111,0110,0010,0100b. The inverted version of this delimiter is 0000,1001,1101,1011b or 0x09DB. A circuit that detects the pattern 0x09DB at a recurring 810-byte interval can determine that the signal is inverted and can right the signal before transmitting it further or dropping it to a local destination. This circuit can be incorporated in a client as illustrated by inversion detection block 806 and inversion correction block 808 of FIG. 8, or alternatively, the inversion can be handled at any point within a XCVR where the inverted service signal is represented in the electrical domain (not illustrated).

Inversion as OAM&P Indicator

It is an aspect of many of the protection schemes in use in networks today (e.g., 1+1) that switching to the protection channel can be accomplished autonomously via local performance monitoring and microcomputer control. For such networks, carrying of an inverted copy of the service signal on the protection channel P, according to this invention, can be used as part of an Operations, Administration, Maintenance, and Provisioning (OAM&P) scheme whereby the failure of S is indicated by a XCVR to a client implicitly by the presence of the inverted signal. For example, as discussed previously, if there is a failure on S, a 2×1 switch and XCVR combination as illustrated previously by FIG. 3 will select the signal on P to pass along to the client along interface 316. For systems that use the XCVR configuration of this invention as illustrated by FIG. 4, this signal will be inverted with respect to the service signal. The presence of an inverted signal at a client can thus be used as an indicator of the presence of a failure on the primary or service path S. This indicator can be communicated to the client without the need for additional circuitry or bandwidth associated with a separate management interface and could in some cases eliminate the need for a management interface at the XCVR.

Modulation-Splitting using MZM2

Figure 5:
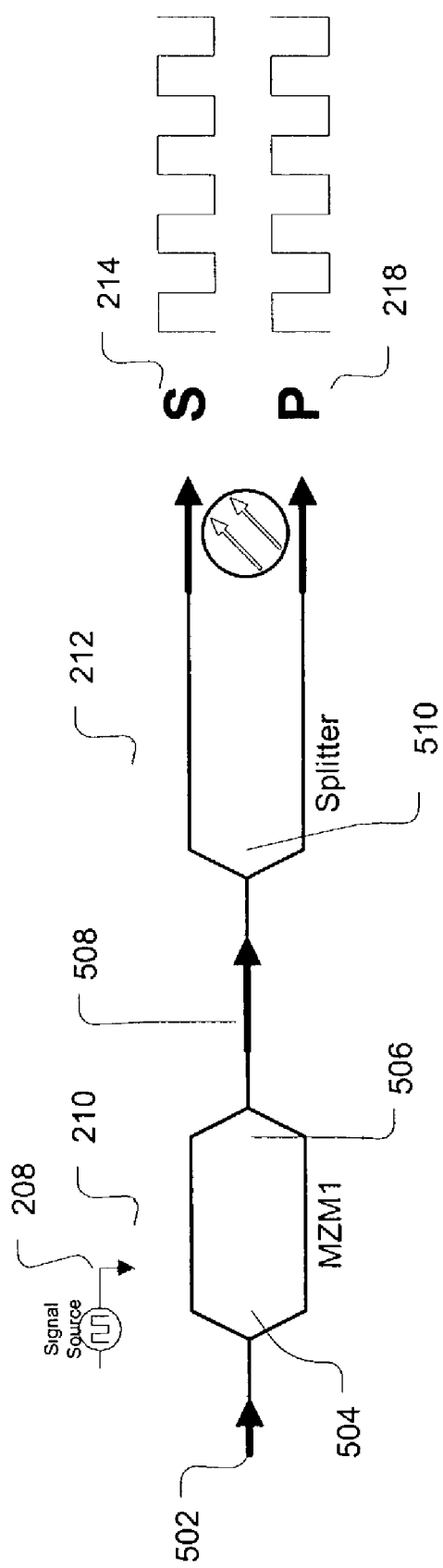
FIG. 5 illustrates the internal architecture of a modulator-splitter of the prior art.

FIG. 5 provides additional detail on one implementation of modulator 210 and splitter 212 of FIG. 2 where modulator 210 is a single-output Mach-Zehnder modulator (MZM1). In FIG. 5, CW laser input 502 is first split 504 by MZM1 210 into two legs. Following modulation and relative phase shifting, the two legs are recombined 506 before being output from the MZM 1. Finally single output 508 of MZM 1 is then input to splitter 212 where it is again split 510 into two legs.

Figure 6:
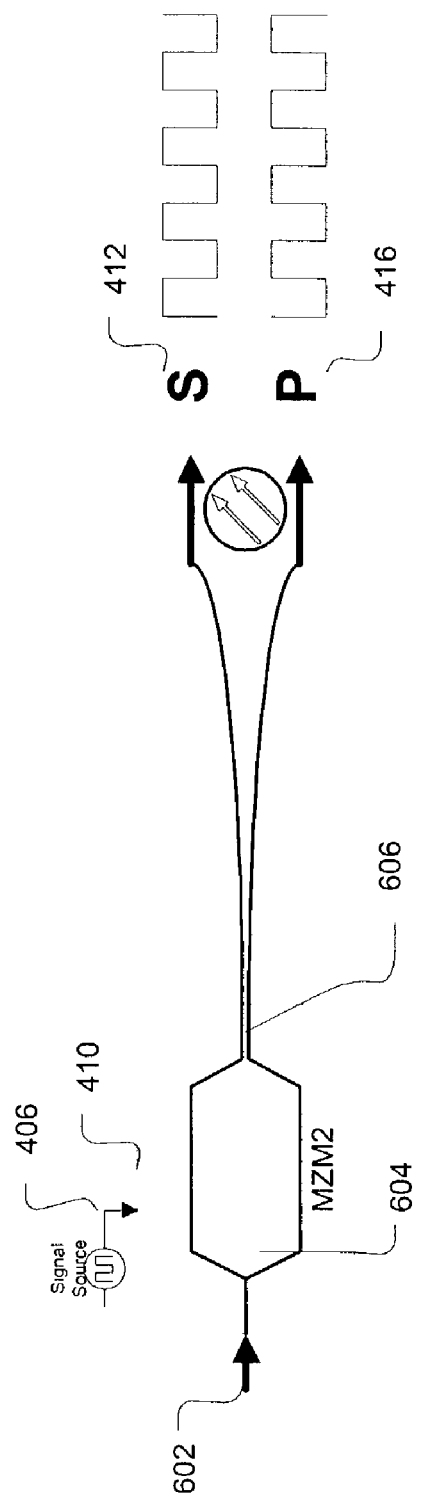
FIG. 6 illustrates the internal architecture of a dual-output Mach-Zehnder modulator as utilized in one implementation of the present invention.

In contrast, FIG. 6 illustrates one view of the internal structure of a modified or dual-output Mach-Zehnder modulator (MZM2) 410 of FIG. 4. In FIG. 6, CW laser input signal 602 is split 604 as in the prior art and the two legs subjected to modulation and phase shifting as before. However, in MZM2 410, the two legs are each individually output 606 from the device. Note that the losses intrinsic to MZM1 210 of FIG. 5 and MZM2 410 of FIG. 6 are nearly identical and that, although MZM2 410 of FIG. 5 exhibits roughly the same loss as MZM1 210 of FIG. 6, the prior art implementation depicted by FIG. 5 is further burdened by the additional loss component, splitter 212. The end result, as stated previously, is that two devices associated with the prior art implementation are replaced with a single device with a resulting decrease in power loss. Although FIG. 5 illustrates an implementation of the external modulator 210 of FIG. 2 in terms of an MZM1, as discussed earlier, any of the classes of electro-absorption and electro-optic modulators could instead have been substituted in accordance with the present invention.

Preemptive Traffic

Figure 7:
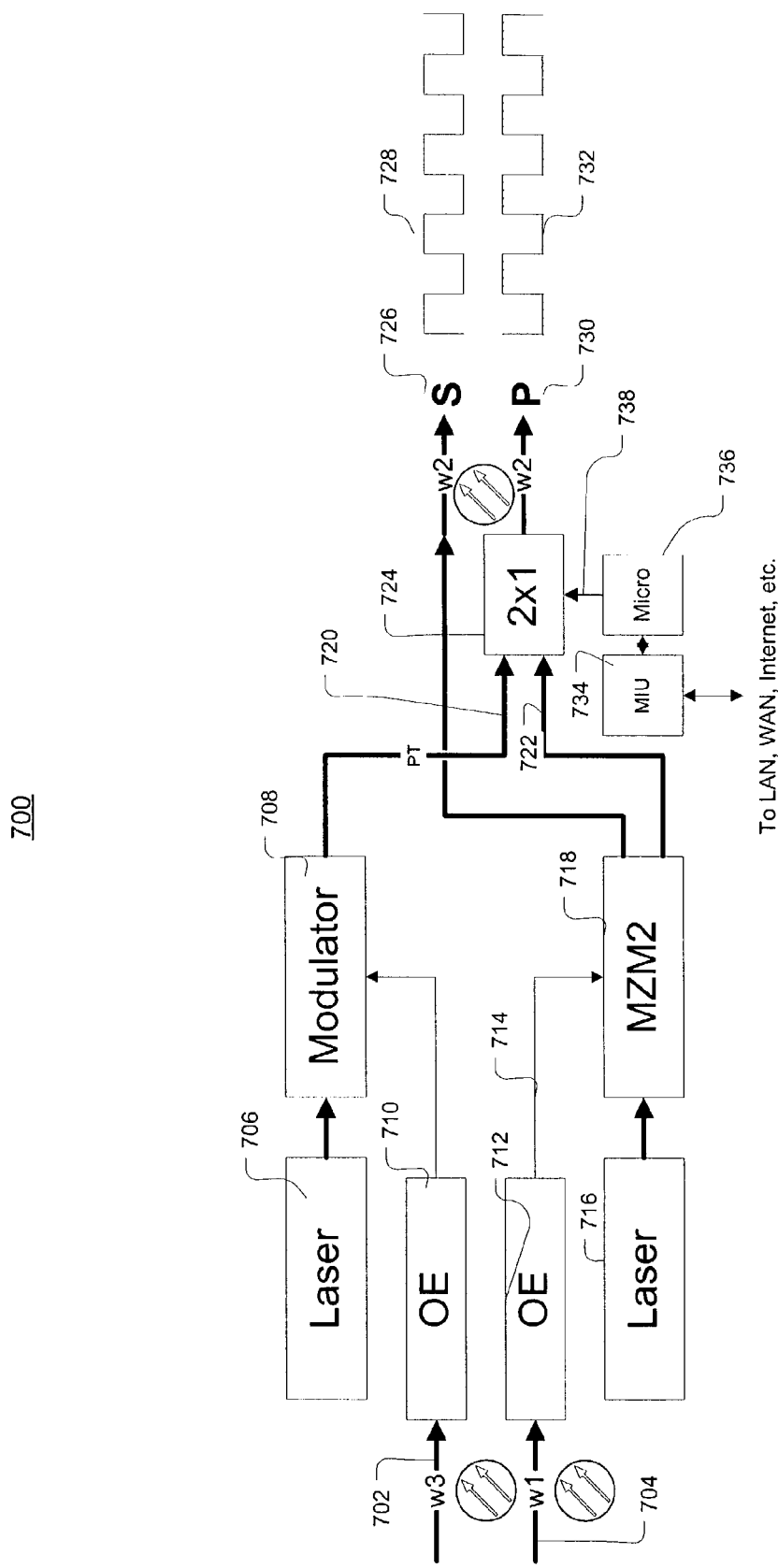
FIG. 7 is a block diagram of an exemplary transceiver of the present invention illustrating support for the insertion of preemptive traffic.

Another embodiment of this invention makes use of the inverted nature of one output of a MZM2 to provide for the simplified detection of the insertion of preemptive or low-priority traffic into the network and simplifies the architecture for carrying either keep-alive or preemptive traffic. FIG. 7 illustrates a transceiver 700 that can be used instead of XCVR 108 and/or XCVR 122 in network 100 of FIG. 1 according to this embodiment of the present invention. As in the prior embodiment, an optical signal 704 of wavelength w1 is input to XCVR 700. The signal is converted to the electrical domain by OE device 712 and the result 714 is used to modulate the output of CW laser 716 using MZM2 718 to produce a service path signal 726 of wavelength w1 which can be different from w2 and an inverted approximation thereof 722. However, in this embodiment, in contrast to the embodiment of this invention illustrated by FIG. 4, in FIG. 7, the inverted output 722 of MZM2 718 does not drive the protection path directly. Instead, it feeds one input of 2×1 switch 724 where the other input is fed with Preemptive Traffic (PT) input 720. As illustrated by FIG. 7, PT is the result of the modulation 708 of the output of local CW laser 706 under control of the output of OE device 710 with external input 702 of wavelength w3, where w3 can be different from w1 and/or w2. Alternatively, the modulator for the signal PT may be external to transceiver 700. Microcontroller 736 is used at the XCVR (alternatively remote computational/control resources (not shown in FIG. 7) may be utilized), optionally in combination with information received via management interface unit 734, to select whether the inverted version of service signal 722 or signal PT 720 is used to drive protection channel P 730. The waveform 732 of the signal carried by P 730 tracks either PT 720 or the inverted version 722 of the service signal S carried by 726. Waveform 728 represents the polarity of the service signal S. PT 720 may contain bursty or low-bandwidth traffic that is opportunistic and whose quality of service (QOS) is not necessarily guaranteed. In the event that the service channel S is fault free, the protection path P can be used to carry preemptive traffic PT at little additional cost to the network provider by utilizing otherwise unutilized bandwidth. This reduces the steady state 100% overhead burden on the network of carrying a duplicate (albeit in this application inverted) version of the service signal on the protection channel P.

Interpreting Inversion in the Context of Preemptive Traffic

Figure 8:
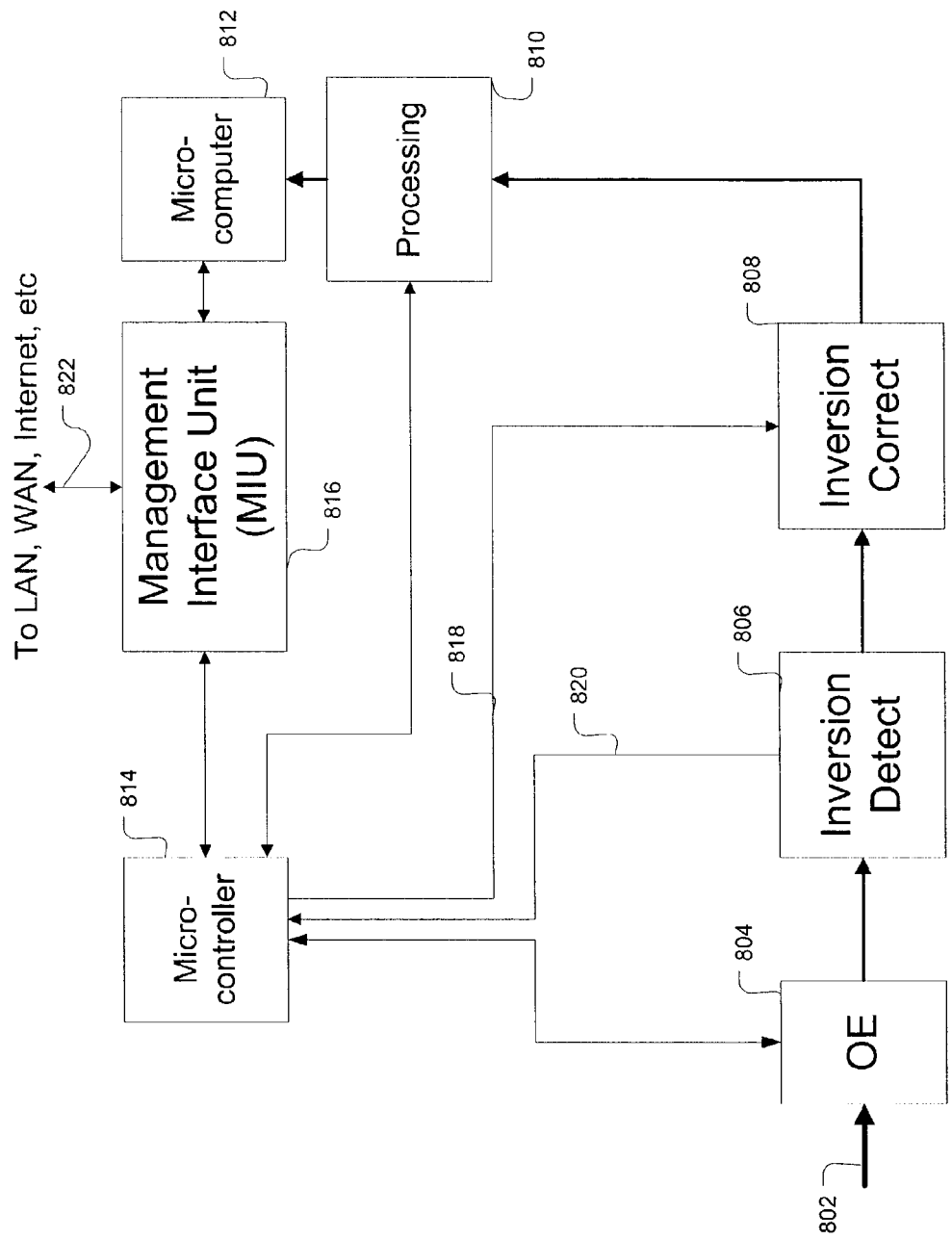
FIG. 8 illustrates an exemplary client architecture according to the present invention.

FIG. 8 illustrates a simplified block diagram of the receive-side of an exemplary client according to this invention analogous to receiver (Rx) 118 of FIG. 1. In the previous embodiment discussed in the context of the XCVR of FIG. 4, where the keep-alive signal carried on the protection path was simply an inverted version of the service signal and there was no facility for carriage of preemptive traffic on P, the presence of an inverted signal at the input to a client would unambiguously indicate a failure on S. As illustrated by FIG. 8, and as discussed earlier, inversion on the input signal 802 could be detected by inversion detection circuitry 806 after conversion of the optical signal to the electrical domain by OE 804. The presence of the inversion would be communicated via signal 820 to microcontroller 814 which in turn would command inversion circuitry 808 via signal 818 to correct the polarity of the signal prior to passing it on to be further processed (e.g., reassembly, etc., in hardware or software) byprocessing block 810 and ultimatelypassed on to the client's local intelligent agent 812 (e.g., the microcontroller). The presence of the inverted signal might also be communicated to microcomputer 812 and/or Management Interface Unit (MIU) 816 for reporting purposes as part of an OAM&P scheme. This reporting might be via separate LAN, WAN, Internet, etc., interface 822 or "in-wavelength"inserted as part of the outbound traffic to the network on the transmit side of the client (not shown). In the current embodiment, however, where the simplified XCVR of the prior embodiment of this invention (as illustrated by FIG. 4) is replaced with the XCVR of FIG. 7, the interpretation of the input to a client becomes more complex. Input 802 to the client of FIG. 8 is the output of a performance-monitoring combination of a 2×1 switch and XCVR such as that illustrated by FIG. 3 where the signal carried on P can be either an inverted version of the service signal S or preemptive traffic (PT). In this case, the presence of an inverted signal at the input of a client still indicates a failure on S but the presence of a non-inverted signal at the input to a client might indicate either service traffic or preemptive traffic. This last ambiguity can be sorted out by the client during the reassembly process or via appropriate communication of the state of the 2×1 switch state in the local XCVR serving the client, as communicated to the client from MIU 330 over management interface 332 in FIG. 3. In the event of a failure on 5, XCVR 128 of FIG. 3 will select P at 2×1 switch 112 to be ultimately driven to the client via output 316. In this case, it should also report the failure on S via management interface 332 so that the inverted version of the service signal can be switched back into P at the sourcing XCVR, illustrated in this example by FIG. 7. Alternatively, 2×1 switch 724 in sourcing XCVR 700 of FIG. 7 can be cycled back and forth under control of microcontroller 736 via control signal 738 between driving P 730 with preemptive traffic 720 and driving P 730 with an inverted version 722 of the service signal. The duty cycle and frequency of this cycling or toggling can be varied to compromise between providing bandwidth for preemptive traffic and providing an inverted signal that the client at the receiver can unambiguously interpret as associated with a failure on S. Again, in this scheme, the detection of a failure on S (potentially at device 128 of FIG. 3 or by virtue of an inverted signal detection at the client of FIG. 8) in this embodiment should be generally followed by an OAM&P communication to the XCVR that is sourcing this toggled signal (in this example, the XCVR of FIG. 7) that there is a failure on the service channel and that preemptive traffic insertion must cease in order to accommodate the use of P exclusively for carriage of the (inverted) service signal. This can be done via in-band or out-of-band signaling around the network. After recovery from the failure on 5, the transmission on P of preemptive traffic or a combination of preemptive traffic and inverted service signal can resume.

Figure 9:
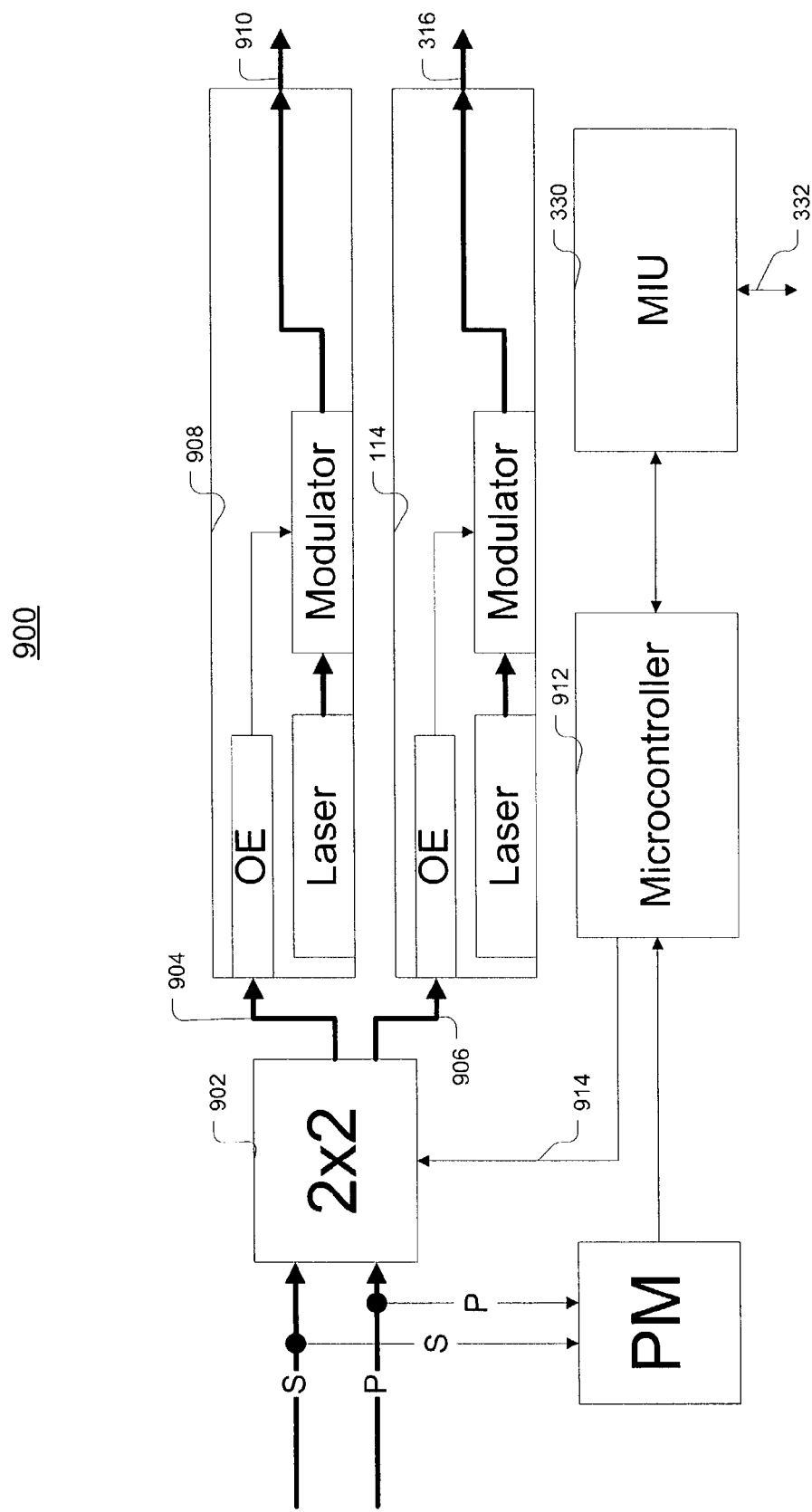
FIG. 9 illustrates an alternative implementation of XCVR block 128 of FIG. 1 according to this invention.

Generally, preemptive traffic is received from the protection channel P by an additional preemptive traffic receiver (not shown) that serves a preemptive signal destination client (also not shown). Another embodiment of this invention involves an enhancement to the transceiver of FIG. 3 that supports concurrent reception of the service signal and the preemptive signal. Assuming there is no failure on the service channel S, this enhanced transceiver can serve both a service signal destination client and a preemptive signal destination client. FIG. 9 illustrates transceiver 900. In XCVR 900, 2×2 switch 902 replaces 2×1 switch 112 of FIG. 3. In addition, XCVR 900 includes a second OE conversion and modulation block 908. 2×2 switch 902 in XCVR 900 is set via control 914 by microcontroller 912 in consideration of various factors including the relative quality of the signals on the service channel S and the protection channel P. The settings of 2×2 switch 902 are summarized in Table A below. In Table A, the switch setting under normal circumstances (e.g., where the service channel is of sufficient quality for normal operation relative to the protection channel) will be designated by "Normal." If the service channel degrades sufficiently either in absolute terms, or relative to the quality of the protection channel, the switch setting will be changed. This new setting is designated by "Failure" in Table A. If the switch setting is "Normal," the protection channel P is connected via 2×2 switch 902 to OE-modulator 908 input port 904 and ultimately output via interface 910 to the preemptive signal destination client. At the same time, the service channel S is connected via 2×2 switch 902 to OE-modulator 114 input port 906 and ultimately output via interface 316 to the service signal destination client. If the switch setting is "Failure," the protection channel P is again connected via 2×2 switch 902 to OE-modulator 908 input port 904 and ultimately output via interface 910 to the preemptive signal client. At this same time, the protection channel P is additionally connected via 2×2 switch 902 to OE-modulator 114 input port 906 and ultimately output via interface 316 to the service signal destination client.

TABLE A

| Switch Setting | To Preemptive Signal Destination Client | To Service Signal Destination Client |
| --- | --- | --- |
| Normal | P | S |
| Failure | P | P |

In an alternative implementation (not illustrated), since the protection channel P signal is fed to the preemptive signal destination client independent of the setting of 2×2 switch 902, P could be optically split into two legs at the input to XCVR 900 with one leg hardwired to input 904 of OE-modulator 908. The other leg of P and the service signal S could be input to a 2×1 optical switch that could select under the control of microcontroller 912 which of those inputs would drive input 906 of OE-modulator 114 to supply signal to the service signal destination client.

In another alternative implementation (not illustrated), the signals carried by the service channel S and the protection channel P can be converted from the optical domain to the electrical domain at the front-end of XCVR 900 producing electrical service and protection signals Se and Pe, respectively. Pe could then be used directly to control the modulator of OE modulator 908. Additionally, Se and an electronic copy of Pe could feed an electronic 2×1 switch under the control of microcontroller 912 whose output would control the modulator of OE-modulator 114.

Depending on the application, the signals processed in accordance with the present invention may be analog or digital.

Note that throughout this document the terms copy, version, and approximation have been used with regard to the service signal to denote a reasonable approximation to the service signal or to an inverted copy thereof. These signals should be understood to be sufficiently similar to or substantially the same as the service signal or the inverted service signal, as the case may be, such that recovery of these signals is reasonably achievable using electrical and optical components of the current state of the art or reasonable extensions thereof.

Also note that, throughout this document, the laser and modulator are depicted in separate boxes. Depending on the implementation, different parts of those components may be implemented in the same or different housings, circuit packs, circuit cards, multi-chip modules, substrates, or mixed-mode ASICs, potentially along with other circuitry. In one possible implementation, the laser and the modulator are integrated together onto the same substrate.

The present invention may be implemented using Mach-Zehnder modulators of the lithium niobate type, although other suitable types of MZ modulators and suitable modulators other than MZ modulators may also be used.

Although this invention has been described broadly with respect to optical networks, it should be understood by one skilled in the art that it is equally applicable to related optical subsystems, including Synchronous Optical Network (SONET) add-drop multiplexers and optical internet-protocol (IP) routers. As used in the claims, the term "network" should be interpreted to cover any of these different subsystems.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. Apparatus for transmitting optical signals over an optical communications network, comprising:
   (a) an input port adapted to receive an input signal;
   (b) a modulator adapted to generate first and second modulated optical signals based on the input signal, wherein the first and second modulated optical signals are substantially inverted versions of each other;
   (c) a 2×1 switch adapted to receive and select between the second modulated optical signal and a preemptive traffic signal; and
   (d) first and second output ports adapted to provide the first modulated optical signal and the output of the 2×1 switch.

2. The invention of claim 1, wherein the modulator is a dual-output Mach-Zehnder device.

3. The invention of claim 1, further comprising:
   (d) an optical-to-electrical (OE) unit, wherein:
      the input signal is an optical input signal; and
      the OE unit is adapted to convert the optical input signal into an electrical signal that is applied to the modulator; and
   (e) a laser adapted to generate a continuous-wave (CW) optical signal for the modulator.

4. The invention of claim 1, wherein:
   the first modulated optical signal is a service channel signal in the network; and
   the output of the 2×1 switch is a keep-alive signal for a protection channel in the network.

5. The invention of claim 1, further comprising:
   (e) a second modulator adapted to generate the preemptive traffic signal; and
   (f) a controller adapted to control the state of the 2×1 switch to select the second modulated optical signal after receiving information regarding a failure in a path associated with the first modulated optical signal.

6. The invention of claim 1, wherein the 2×1 switch is controlled to toggle back and forth between the second modulated optical signal and the preemptive traffic signal.

7. A method for transmitting optical signals over an optical communications network, comprising the steps of:
   (a) receiving an input signal;
   (b) generating first and second modulated optical signals based on the input signal, wherein the first and second modulated optical signals are substantially inverted versions of each other;
   (c) providing the first modulated optical signal as a first output signal; and
   (d) receiving and selecting between the second modulated optical signal and a preemptive traffic signal for a second output signal.

8. The invention of claim 7, wherein step (b) is performed using a dual-output Mach-Zebnder device.

9. The invention of claim 7, wherein:
   the input signal is an optical input signal;
   step (a) comprises the step of converting the optical input signal into an electrical signal that is applied to the modulator; and
   a laser generates a continuous-wave (CW) optical signal for the modulator.

10. The invention of claim 7, wherein:
    the first modulated optical signal is a service channel signal in the network; and
    the second output signal is a keep-alive signal for a protection channel in the network.

11. The invention of claim 7, wherein the second modulated optical signal is selected after receiving information regarding a failure in a path associated with the first modulated optical signal.

12. The invention of claim 11, wherein step (d) comprises the step of toggling back and forth between the second modulated optical signal and the preemptive traffic signal.

13. The invention of claim 7, wherein the input signal is a digital signal.

14. A method for receiving optical signals over an optical communications network, comprising the steps of:
    (a) receiving a first optical signal associated with a service channel in the network;
    (b) receiving a second optical signal associated with a protection channel in the network, wherein the second optical signal is a preemptive traffic signal;
    (c) detecting whether the service channel is acceptable;
    (d) selecting the second optical signal and transmitting information to cause the second optical signal to be a substantially inverted version of the first optical signal if the service channel is determined to be not acceptable.

15. The invention of claim 14, further comprising the step of inverting a signal corresponding to the second optical signal.

16. The invention of claim 14, wherein the second optical signal is transmitted to a client without inversion.

17. The invention of claim 14, wherein the received signals are digital signals.

18. The invention of claim 14, further comprising:
    (a) receiving one of the first and second optical signals;
    (b) determine whether the received optical signal is a protection channel signal by detecting whether the received optical signal is a substantially inverted version of a corresponding service channel signal; and
    (c) inverting a signal corresponding to the received optical signal upon determining that the received optical signal is the protection channel signal.

19. A method for receiving an optical signal over an optical communications network, comprising the steps of:
    (a) receiving the optical signal;
    (b) determining whether the optical signal is a protection channel signal by detecting whether the optical signal is a substantially inverted version of a corresponding service channel signal; and
    (c) inverting a signal corresponding to the optical signal upon determining that the optical signal is the protection channel signal; wherein
    the optical signal corresponds to a toggling between the protection channel signal and a preemptive traffic channel; and
    step (b) comprises the step of detecting the toggling and transmitting information to cause the optical signal to correspond to only the protection channel signal.

20. The invention of claim 19, wherein step (b) comprises the step of analyzing the optical signal to detect an inverted bit pattern associated with a transmission protocol.

21. The invention of claim 19, further comprising the step of transmitting information reporting the detection of the protection channel signal.

22. The invention of claim 19, wherein the received signal is a digital signal.

23. An optical communications network comprising a first transceiver redundantly connected to a second transceiver via first and second optical paths, wherein:
the first transceiver is adapted to convert an input signal from a first client in the network into first and second modulated optical signals that are substantially inverted versions of each other, wherein the first transceiver comprises a 2×1 switch adapted to receive and select between the second modulated optical signal and a preemptive traffic signal, to be transmitted over the second optical path;
the first optical path is adapted to convey the first modulated optical signal from the first transceiver to the second transceiver;
the second optical path is adapted to convey the output of the 2×1 switch from the first transceiver to the second transceiver; and
the second transceiver is adapted to receive the first modulated optical signal and the output of the 2×1 switch and select one of them for transmission as an output signal to a second client in the network.

24. The invention of claim 23, wherein:
the first modulated optical signal is a service channel signal in the network; and
the output of the 2×1 switch is a keep-alive signal for a protection channel in the network.

25. The invention of claim 23, wherein the first transceiver comprises a dual-output Mach-Zebnder device adapted to generate the first and second modulated optical signals based on a modulation control signal based on the input signal.

26. The invention of claim 23, wherein the first transceiver further comprises:
(e) a second modulator adapted to generate the preemptive traffic signal; and
(f) a controller adapted to control the state of the 2×1 switch to select the second modulated optical signal after receiving information regarding a failure in the first optical path.

27. The invention of claim 23, wherein the 2×1 switch is controlled to toggle back and forth between the second modulated optical signal and the preemptive traffic signal.

28. The invention of claim 23, wherein the second transceiver is adapted to:
(a) receive the first modulated optical signal associated with a service channel in the network;
(b) receive the output of the 2×1 switch, associated with a protection channel in the network;
(c) detect whether the service channel is acceptable;
(d) select the second optical signal if the service channel is determined to be not acceptable.

29. The invention of claim 28, wherein the second transceiver is adapted to invert a signal corresponding to the second modulated optical signal.

30. The invention of claim 28, wherein the second transceiver is adapted to transmit the output signal to the second client without inversion.

31. The invention of claim 28, wherein:
prior to detecting that the service channel is not acceptable, the second modulated optical signal is a preemptive traffic signal; and
the second transceiver is adapted to transmit information to cause the second optical signal to be the substantially inverted version of the first optical signal.

32. The invention of claim 23, wherein the second client is adapted to:
(a) receive the output signal;
(b) determine whether the output signal is a protection channel signal by detecting whether the output signal is a substantially inverted version of a corresponding service channel signal; and
(c) invert the output signal upon determining that the output signal is the protection channel signal.

33. The invention of claim 32, wherein the second client is adapted to transmit information reporting the detection of the protection channel signal.

34. The invention of claim 23, wherein:
the output signal corresponds to a toggling between the second modulated optical signal and the preemptive traffic signal; and
the second client is adapted to detect the toggling and transmit information to cause the output signal to correspond to only the second modulated optical signal.

35. An optical communications network comprising a first transceiver redundantly connected to a second transceiver via first and second optical paths, wherein:
the first transceiver is adapted to:
(a) convert an input signal from a first client in the network into first and second modulated optical signals that are substantially inverted versions of each other;
(b) transmit the first modulated optical signal to the second transceiver via the first optical path; and
(c) select and transmit one of the second modulated optical signal and a preemptive traffic signal, as a second transmitted optical signal, to the second transceiver via the second optical path; and
the second transceiver is adapted to:
(a) receive the first modulated optical signal associated with a service channel in the network;
(b) receive the second transmitted optical signal associated with a protection channel in the network;
(c) select one of the first modulated optical signal and the second transmitted optical signal, as an output signal to a second client in the network;
(d) detect whether the service channel is acceptable; and
(e) select the second transmitted optical signal for transmission to the second client if the service channel is not acceptable, wherein, prior to detecting that the service channel is not acceptable, the second transmitted optical signal is the preemptive traffic signal.

36. The invention of claim 35, wherein, after detecting that the service channel is not acceptable, the second transceiver is adapted to transmit information to cause the second optical path to transmit the substantially inverted version of the first optical signal.

37. An optical communications network comprising a first transceiver redundantly connected to a second transceiver via first and second optical paths, wherein:
the first transceiver is adapted to convert an input signal from a first client in the network into first and second modulated optical signals that are substantially inverted versions of each other;
the first optical path is adapted to convey the first modulated optical signal from the first transceiver to the second transceiver;

the second optical path is adapted to convey the second modulated optical signal from the first transceiver to the second transceiver;

the second transceiver is adapted to receive the first and second modulated optical signals and select one of them for transmission as an output signal to a second client in the network; and the second client is adapted to:
(a) receive the output signal;
(b) determine whether the output signal is a protection channel signal by detecting whether the output signal is a substantially inverted version of a corresponding service channel signal; and
(c) invert a signal corresponding to the output signal upon determining that the output signal is the protection channel signal.

38. The invention of claim 37, wherein the second client is adapted to transmit information reporting the detection of the protection channel signal.

39. An optical communications network comprising a first transceiver redundantly connected to a second transceiver via first and second optical paths, wherein:

the first transceiver is adapted to convert an input signal from a first client in the network into first and second modulated optical signals that are substantially inverted versions of each other;

the first optical path is adapted to convey the first modulated optical signal from the first transceiver to the second transceiver;

the second optical path is adapted to convey the second modulated optical signal from the first transceiver to the second transceiver;

the second transceiver is adapted to receive the first and second modulated optical signals and select one of them for transmission as an output signal to a second client in the network, wherein the output signal corresponds to a toggling between the second modulated optical signal and a preemptive traffic signal; and the second client is adapted to detect the toggling and transmit information over the network to cause the output signal to correspond to only the protection channel signal.

* * * * *

UNITED STATES PATENT AND TRADEMARK OFFICE
CERTIFICATE OF CORRECTION

| | | |
|---|---|---|
| PATENT NO. | : 7,171,116 B2 | Page 1 of 1 |
| APPLICATION NO. | : 10/245029 | |
| DATED | : January 30, 2007 | |
| INVENTOR(S) | : Steven K. Korotky and David S. Levy | |

It is certified that error appears in the above-identified patent and that said Letters Patent is hereby corrected as shown below:

In column 11, line 65, replace "Mach-Zebnder" with --Mach-Zehnder--.
In column 13, line 33, replace "Mach-Zebnder" with --Mach-Zehnder--.

Signed and Sealed this

Tenth Day of April, 2007

JON W. DUDAS
*Director of the United States Patent and Trademark Office*